United States Patent
Zenzen et al.

(10) Patent No.: US 6,460,941 B1
(45) Date of Patent: Oct. 8, 2002

(54) METHOD FOR CONTROLLING BRAKE-PRESSURE CHARACTERISTICS IN THE REAR WHEEL BRAKES OF A MOTOR VEHICLE BRAKE SYSTEM WITH ELECTRONIC REGULATION OF BRAKE POWER DISTRIBUTION

(75) Inventors: Markus Zenzen, Hilden; Thomas Knapp, Kahl; Thomas Bauer, Bullay, all of (DE)

(73) Assignee: Continental Teves AG & Co. OHG, Frankfurt (DE)

(*) Notice: Subject to any disclaimer, the term of this patent is extended or adjusted under 35 U.S.C. 154(b) by 0 days.

(21) Appl. No.: 09/530,652
(22) PCT Filed: Oct. 27, 1998
(86) PCT No.: PCT/EP98/06801
§ 371 (c)(1), (2), (4) Date: Aug. 10, 2000
(87) PCT Pub. No.: WO99/24300
PCT Pub. Date: May 20, 1999

(30) Foreign Application Priority Data

Nov. 6, 1997 (DE) .......................................... 197 49 048
Mar. 21, 1998 (DE) .......................................... 198 12 554

(51) Int. Cl.[7] .................................................. B60T 8/88
(52) U.S. Cl. .................................. 303/122.03; 303/122
(58) Field of Search ............................. 303/9.62, 9.63, 303/113.5, 153, 186, 187, 188, 122, 122.03, 122.06, 122.04, 122.07, 122.09; 188/349

(56) References Cited

U.S. PATENT DOCUMENTS

| | | | | |
|---|---|---|---|---|
| 5,558,415 A | * | 9/1996 | Buschmann et al. | 303/186 |
| 5,632,535 A | * | 5/1997 | Luckevich et al. | 303/186 |
| 5,899,540 A | * | 5/1999 | Burgdorf et al. | 303/186 |
| 5,938,295 A | * | 8/1999 | Stumpe et al. | 303/9.69 |
| 6,009,366 A | * | 12/1999 | Burkhard et al. | 303/186 |
| 6,119,062 A | * | 9/2000 | Proger et al. | 303/155 |

FOREIGN PATENT DOCUMENTS

| | | |
|---|---|---|
| DE | 39 21 309 | 1/1991 |
| DE | 44 14 980 | 11/1995 |
| DE | 44 17 935 | 11/1995 |
| DE | 44 18 768 | 12/1995 |
| DE | 195 41 601 | 5/1997 |
| DE | WO 97/23371 | * 7/1997 |
| DE | WO 97/38881 | * 10/1997 |
| DE | 197 05 619 | 8/1998 |
| EP | 0 096 346 | 12/1983 |
| EP | 0 100 096 | 2/1984 |
| EP | 0 392 815 | 10/1990 |
| EP | 0 563 740 | 10/1993 |

OTHER PUBLICATIONS

Search Report of the German Patent Office for Application No. 198 12 554.2.

* cited by examiner

Primary Examiner—Jack Lavinder
Assistant Examiner—Thomas J. Williams
(74) Attorney, Agent, or Firm—Rader, Fishman & Grauer PLLC

(57) ABSTRACT

In a method of controlling the braking pressure variation during EBD control, during a braking operation, the vehicle deceleration is sensed and evaluated as a control criterion, and an increase in the braking pressure in the rear-wheel brakes is only permitted if the vehicle deceleration after commencement has risen above a predetermined minimum value, or if there are criteria which indicate brake fading or a brake malfunction, or if the vehicle deceleration exceeds a defined limit value.

8 Claims, 2 Drawing Sheets

METHOD FOR CONTROLLING BRAKE-PRESSURE CHARACTERISTICS IN THE REAR WHEEL BRAKES OF A MOTOR VEHICLE BRAKE SYSTEM WITH ELECTRONIC REGULATION OF BRAKE POWER DISTRIBUTION

TECHNICAL FIELD

The present invention relates to a method for controlling the braking pressure variation in the rear-wheel brakes of a vehicle brake system having electronic control of the brake force distribution (EBD function).

BACKGROUND OF THE INVENTION

It is prior disclosed to adjust the distribution of brake force to the front and rear axles, which is subjected to dynamic influences, by means of electronically controlled hydraulic valves. Principally, the rotational behavior of the wheels is measured by wheel sensors and evaluated to limit or adjust the brake slip of the rear wheels. As is known, an excessively great amount of brake slip on the rear wheels could jeopardize driving stability of the vehicle and cause skidding of the vehicle.

EP 0 563 740 A 1 discloses a method of controlling brake force distribution wherein the brake force variation on the rear-wheel brakes shall be controlled appropriately in cooperation with an ABS system in order to transmit the maximum possible brake force to the rear wheels, wherein the braking pressure is transmitted from the brake master cylinder to the rear wheels without changes until a braking pressure limit value and, starting from the braking pressure limit value, the braking pressure to the rear wheels is load-responsively reduced by means of a brake force control valve. The degree of braking is sensed during a braking operation, and the function of the brake force control valve will be eliminated by way of an electromagnetic valve when the braking degree becomes lower than a preset braking degree limit value and the brake force control valve will start to operate when the braking degree is higher than the braking degree limit value, and the braking pressure limit value will be corrected to adopt a lower value when the ABS system for the rear wheels responds.

By means of electrically controllable hydraulic valves which are inserted in the pressure fluid conduit from the master cylinder to the rear-wheel brakes in a brake system of this type, braking pressure and, thus, brake slip is limited to an allowable degree by switching the valves over and, hence, shutting off the pressure fluid conduit to the rear-wheel brakes. This phase where pressure is maintained constant is followed by a new pressure increase phase in many cases, for example, in the event that the initial pressure is increased, or when the brake slip on the rear wheel has decreased again.

The commencement of EBD control (electronic brake force distribution control) frequently occurs in a relatively steady, balanced phase of the braking operation or partial braking operation (in contrast to a panic stop, for example). Noises which are caused by valve actuation in this phase are audible and may irritate the driver and passengers. Such noises reduce the comfort in any case.

German patent application No. 33 01 948 discloses a method of electronically controlling the brake force distribution wherein the brake slip and the longitudinal deceleration of the vehicle are determined from the rotational behavior of the individual wheels, and wherein the brake slip on the rear wheels is limited to a defined percentage of the brake slip on the front wheels by actuation of the braking pressure control valves. German patent application No. 33 06 611 additionally provides a possibility of reducing the braking pressure on the rear axle by way of a hydraulic, electronically operable valve which opens a conduit from the rear-wheel brakes to a pressure supply reservoir.

It is an object of the present invention to provide a method of electronically controlling the brake force distribution which ensures an effective brake force distribution, more particularly, an effective introduction of braking pressure into the rear-wheel brakes without disturbing effects or side effects such as noise development. Compared to conventional systems where disturbing noises occur on valve actuation, one objective was to reduce valve switching noises and thereby increase the comfort.

The method of the present invention include the following steps. During a braking operation, i.e. partial braking operation or ABS control operation, the vehicle deceleration is sensed and evaluated as a control criterion, and that an increase in the braking pressure in the rear-wheel brakes after the commencement of an EBD control function (EBD commencement) is only permitted if (a) the vehicle deceleration after EDB commencement has risen above a predetermined minimum value, and/or if (b) the presence of criteria which indicate brake fading, the imminent risk of fading, or brake malfunction is detected, and/or if (c) the vehicle deceleration exceeds a high limit value which is critical for the safety of the vehicle. A combination of the conditions (a) and (b) or the conditions (a) and (c) has proved to be especially favorable.

The method of the present invention is based on the knowledge that it is sufficient to allow further braking pressure buildup in the rear-wheel brakes only under the condition that defined conditions or criteria are satisfied. In case (a), this means that a higher rear-wheel braking pressure is necessary because, for example, the driver requests a greater deceleration or has initiated increase in braking pressure by application of a higher pedal force. In this case, braking pressure increase on the rear axle can be started when the vehicle deceleration after EBD commencement has risen by a defined deceleration value of e.g. 0.2 g or more. This is an indicator of situation (a).

In an embodiment of the method of the present invention, a vehicle deceleration increase ranging between 0.15 g and 0.3 g, for example a value of roughly 0.2 g, is predetermined as a minimum value, the exceeding of which is evaluated as a criterion for allowing a braking pressure increase in the rear-wheel brakes, where 'g' means the constant of acceleration due to gravity. This is an example for the situation (a).

In another embodiment of the method of the present invention, a criterion or an indication of brake fading, an imminent risk of fading, or a defect is obtained by means of a counter, the content of which counter is varied during a braking operation or during brake actuation according to a predetermined time frame (for example, upon each working clock, a multiple of the working clock, each loop or a multiple). The counter content is increased in the predetermined time frame by respectively a value which depends on the increase in vehicle deceleration. Decrease of the counter content is most simply carried out by an invariable frame. It can also be appropriate to reduce the counter content with declining brake temperature or in dependence on measured quantities which represent the brake temperature, on the vehicle speed, etc.

It has proven suitable to have the increase of the counter content set in with the rise in the vehicle deceleration by roughly 0.1 to 0.15 g per frame step. With higher increases in vehicle deceleration, the counter content is increased more quickly in comparison to the change at a low increase in the vehicle deceleration.

Decrease of the counter content can be linked logically to the release of the brake or uncoupling of the brake pedal which can be seen, for example, in the change in the signal of the brake light switch.

It is also provided within the scope of the present invention to vary the counter rate in dependence on the vehicle speed. Further, it is appropriate to produce a model of the brake temperature in dependence on the brake actuation signals and other influencing variables because the occurrence of brake fading becomes more likely as the temperature increases.

With a particularly high vehicle deceleration of e.g. more than 0.45 g, which can only be caused by a very vigorous brake actuation, stopping or delaying the braking pressure buildup on the rear axle is principally given up in favor of decelerating to achieve an especially short stopping distance for reasons of safety.

DETAILED DESCRIPTION OF THE PREFERRED EMBODIMENTS

Figure 1:
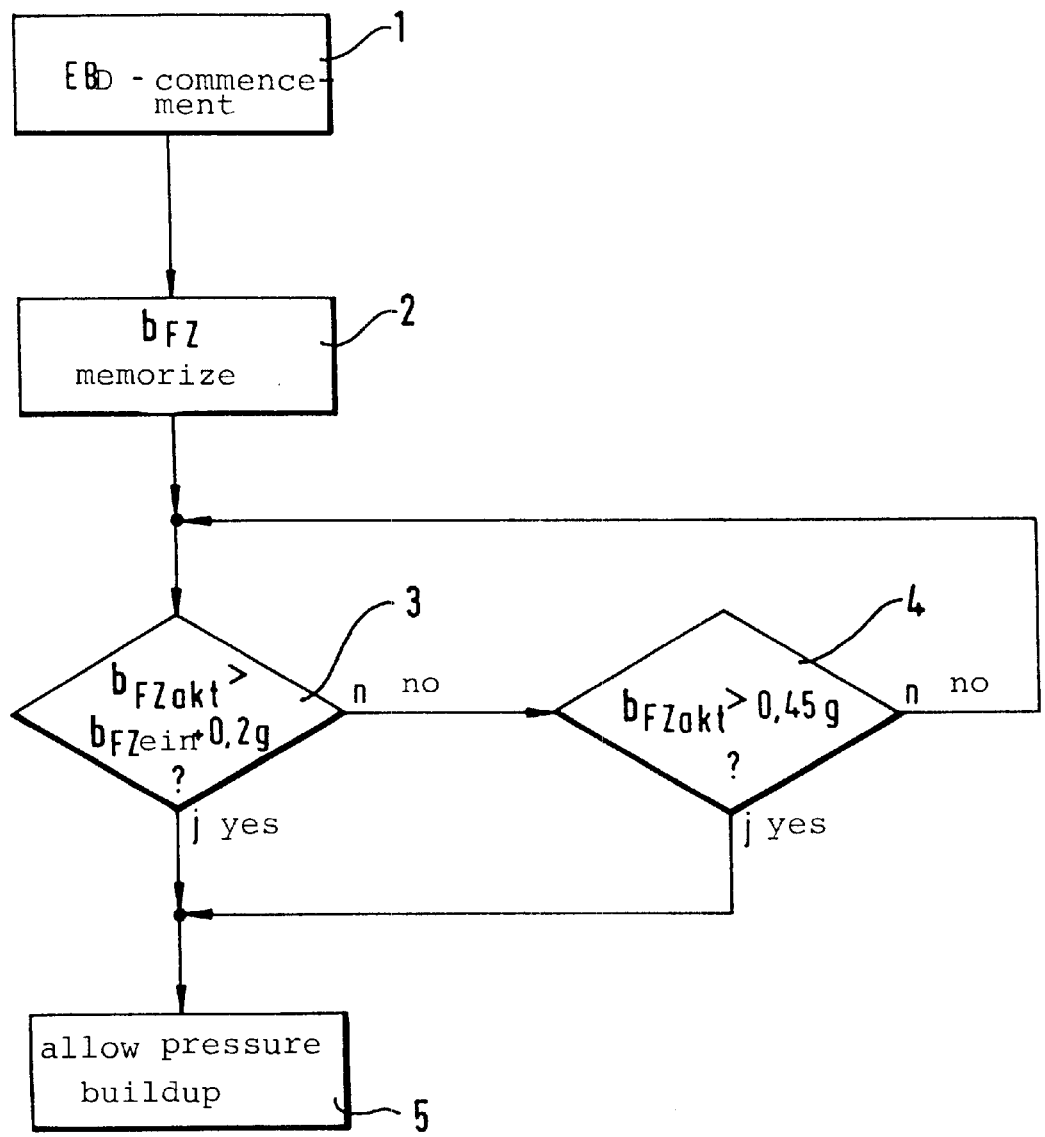
FIG. 1 is a flow chart showing the principal mode of effect of the method of the present invention.

In a braking operation with electronically controlled distribution of brake force to the front axle and rear axle, called EBD control or EBD function in short, further braking pressure buildup in the rear-wheel brakes is principally allowed only in case this is deemed suitable or necessary according to the present invention. This is the case, for example, when the driver increases the pedal force and, hence, the initial pressure. The intention is to decelerate the vehicle at an increased rate. The admission of further pressure buildup on the rear axle is coupled to the increase in vehicle deceleration in this case. Pressure buildup is admitted, in steps, when the vehicle deceleration after EBD commencement has risen above a predetermined limit value in a defined length of time. This is case (a) mentioned hereinabove.

Numerical Example:

EBD commences at a vehicle deceleration of 0.4 g. A deceleration difference of 0.2 g is predetermined as a minimum value of the increase. In this case, further pressure buildup on the rear axle is not allowed until the vehicle deceleration reaches at least 0.6 g.

It should be taken into consideration, however, that there are situations where the driver intends a greater deceleration but cannot achieve it because his/her pedal force is not sufficient. Such a case occurs e.g. when brake fading prevails, or a defect occurs in the brake system, for example, in the brake force booster.

The present invention starts from the reflection that, for example, in a case of brake fading, the driver should be in a position to increase the braking pressure in order to maintain the vehicle deceleration constant. For an increase in deceleration, the braking pressure would have to rise still further. Also, the case is possible that the deceleration even decreases because the driver is not able to increase the braking pressure due to the excessive need of pedal force.

Underlying the present invention is the reflection that pressure increase on the rear axle should be rendered possible in such cases during EBD control. However, this target cannot be reached by way of the criteria described in case (a) hereinabove, for what reason other indications or criteria pointing to brake fading or defects are evaluated according to the present invention. The above-described criterion of increase in deceleration (case (a)) becomes inapplicable when sufficient vehicle deceleration can no longer be reached due to brake fading or defects.

Therefore, measures (b) and (c) will be taken according to the present invention.

In case (c), further braking pressure increase on the rear axle is allowed for safety reasons when the vehicle deceleration reaches or exceeds a relatively high predetermined limit value of 0.45 g, for example. One may assume that the driver, with a high brake force, can reach a deceleration of 0.45 g (corresponding to a pedal force of roughly 500 N) also in a case of malfunction. Thus, further pressure increase on the rear axle is principally allowed in this case (c) for safety reasons.

In case (b), the objective includes detecting the presence or the imminent risk of brake fading and allowing pressure buildup on the rear axle as a result of this detection. It is advantageous also in this case that pressure buildup occurs only when needed.

Brake fading may occur in various ways, either during long-lasting braking operations (driving downhill/at high speeds) and/or during frequent braking intervals.

Of course, brake fading not only depends on the time of braking or the brake actuation time, but also on the braking pressure or the vehicle deceleration, respectively. To detect brake fading, it is therefore provided according to a favorable embodiment of the present invention to use a counter in the control software which, starting from a defined counter content or count of the counter, will activate a bit which signals the brake fading case. Upward counting of the counter will start in this case with each brake actuation which can be recognized, for example, by the brake light switch changing from 0 to 1, and/or in a vehicle deceleration which exceeds a value of e.g. 0.1 g in the time frame (in the time frame, that means, with each loop or a multiple of a loop).

Upward counting in the time frame (per loop or a multiple) occurs to a greater degree at higher deceleration values, and the following graduation may be chosen:

| Vehicle deceleration (in g) | Counter content |
| --- | --- |
| 0.11–0.3 | +1 |
| 0.31–0.5 | +2 |
| 0.51–0.7 | +3 |
| 0.71–0.9 | +4 |
| >0.91 | +5 |

Of course, these values are only exemplary values which depend on the braking behavior desired and on the respective type of vehicle.

The counter is counted downwards e.g. to a value below 0.05 g in the time frame after a change-over of the brake light switch from 1 to 0. The deceleration dependency (<0.05 g) applies especially to the case that the control is operated independently of the brake light switch in order to prevent a defective brake light switch from having detrimental effects on the control.

Thus, the counter which is used according to the present invention in one embodiment is counted upwards and downwards outside and within an EBD or ABS control operation. Consequently, it is also possible to set the bit for the brake fading detection within and outside the control operation. If this setting is done outside a control operation, the braking pressure in the rear-wheel brakes will be built up instantaneously with the EBD commencement in the pressure increase phase. If, however, such a setting is done within an EDB control operation, pressure buildup will not be allowed until this point of time, that means, only after brake fading has been detected. The bit will be deleted as soon as the counter value falls short of a predetermined nominal value. This situation occurs when the brake has not been actuated for a long period of time.

Counting upwards and downwards of the counter is suitably varied in response to the vehicle speed because, for example, cooling of the brake during braking operations also depends on the vehicle speed. Cooling and the degree of cooling, in turn, depends on the respective vehicle type, the flow conditions of the vehicle, the use and dimensioning of cooling ducts for the brake, etc.

Further, it is also possible to make use of temperature models which are already provided in some brake control systems and permit estimating the respectively prevailing temperature in response to brake actuation signals and other influences. In such a case, the braking pressure buildup on the rear axle is allowed again starting with a defined, calculated brake disc temperature on the front axle.

In brake systems and vehicle control systems which sense the pressure in the master cylinder, it is also possible to define a detection criterion for brake fading by way of the pressure sensor. Brake fading or suspected brake fading prevails, for example, if the braking pressure in the wheel brake is very high, yet the vehicle deceleration is below the amount which is to be expected by way of calculation. For example, there applies the rough formula according to which a braking pressure increase of 10 bar causes a vehicle deceleration of roughly 0.1 g. Thus, fading detection is also this way possible, with the result that pressure buildup on the rear axle is allowed again.

The flow chart according to FIG. I illustrates the operation of the method of the present invention described hereinabove. After EBD commencement detected in step 1, the vehicle deceleration $b_{FZ}$ is sensed in step 2 and stored for evaluation. Now a check is made in step 3 whether the current vehicle deceleration $b_{FZ}$ has risen above a predetermined minimum difference value of 0.2 g in relation to the vehicle deceleration upon EBD commencement ($b_{FZein}$). If this is not the case, and if condition 4 is not satisfied either, the loop leads back to the input of step 3.

If satisfied, condition 4 indicates that the current vehicle deceleration $b_{FZakt}$ has exceeded the high deceleration value of 0.45 g.

If conditions 3 or 4 are satisfied, further pressure buildup on the rear axle of the vehicle is allowed in step 5.

The detection of brake fading described hereinabove is not illustrated in FIG. 1. This detection could be shown by a condition inquiry similar to step 4 in FIG. 1.

Figure 2:
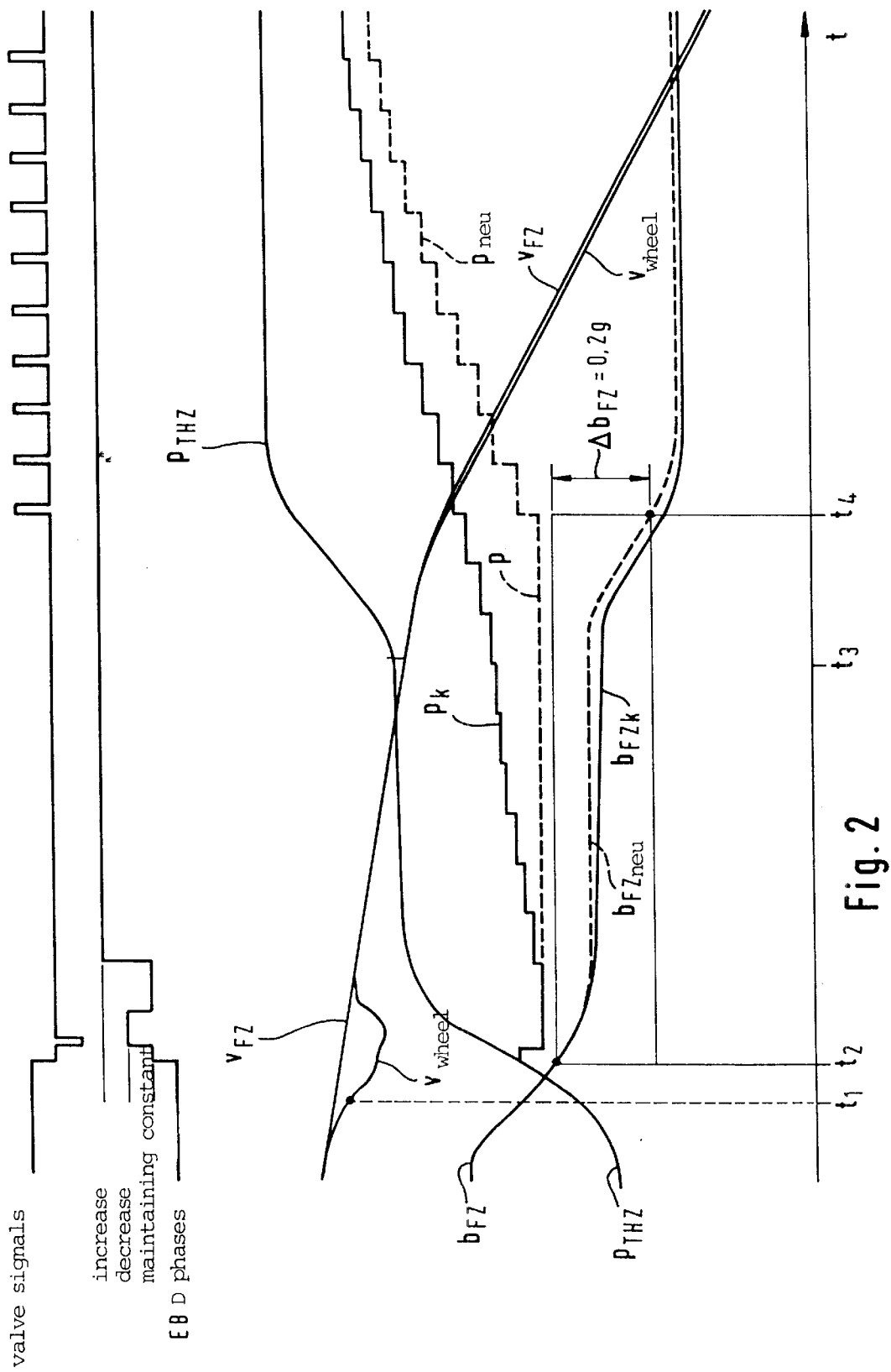
FIG. 2 is a diagram showing a braking pressure and EBD control operation wherein some of the measures of the present invention are implemented.

In the embodiment of FIG. 2, a conventional EBD pressure buildup modulation on the rear axle is compared to a pressure buildup modulation with an implementation of the method of the present invention (deceleration-responsive modulation). The upper curves exhibit the valve signals which cause valve actuation (actuation of the inlet and outlet valves associated with the respective rear-wheel brake), and the EBD phases. The solid lines relate to the previous pressure buildup modulation, the dotted lines to the respective modulation according to this invention.

FIG. 2 further represents the vehicle speed $V_{FZ}$ and the speed variation $V_{Rad}$ of a rear wheel which adopts a relatively high brake slip value and initiates EBD commencement approximately at the point of time $t_1$.

In addition, the pressure variation $p_{THZ}$ in the master cylinder in the example described herein is shown in FIG. 2. Approximately at time $t_3$ the driver increases the pedal force and, thus, the master cylinder pressure $P_{THZ}$ which, in the pressure buildup modulation of the present invention, will not initiate increase of the braking pressure in the rear-wheel brakes until the time $t_4$. Before this time, i.e. in the period between $t_2$ and $t_4$, the pressure in the rear-wheel brakes remained constant due to the method of the present invention in spite of the EBD control operation, while the pressure in the time frame would have been increased in a conventional pressure buildup modulation. These different pressure buildup characteristic curves $P_{neu}$ and $P_k$ (conventional) are also illustrated in FIG. 2 and show the different pressure variations in the rear-wheel brakes during an EBD control when the conventional method and the method of the present invention are employed.

Finally, FIG. 2 still illustrates the vehicle deceleration $b_{FZ}$. In the period of time between $t_2$ and $t_4$, the vehicle deceleration (shown in dotted lines) as it appears when the method of the present invention is used, differs only insignificantly from vehicle deceleration in a conventional EBD control.

In the period between $t_2$ and $t_4$, however, the deceleration has increased by 0.2 g in the example of a situation as described in FIG. 2. The decisive minimum value of 0.2 g is thus achieved, for what reason pressure buildup on the rear axle is allowed again following $t_4$. The valve actuation (topmost curve in FIG. 2) and, accordingly, the pressure rise take place according to a time frame which preferably corresponds to the working clock, the loops, or a multiple of these loops in circuits of this type.

A major reduction in noise and, hence, enhanced comfort is achieved by the deceleration-responsive introduction of braking pressure into the rear-wheel brakes in the EBD case, as disclosed in the present invention, because the corresponding inlet valve is actuated only if there is actual need. This braking pressure introduction does not involve any appreciable reduction in brake activity or a longer stopping distance because, following $t_4$, the braking pressure will rise again relatively quickly to the pressure level prevailing with a conventional pressure modulation, as is shown in FIG. 2.

What is claimed is:

1. Method of controlling the brake force distribution in a vehicle brake system with electronic control of the brake force distribution between the front and rear axles, wherein during a braking operation, the vehicle deceleration is sensed and evaluated as a control criterion, comprising the steps of:

permitting an increase in the braking pressure in the rear-wheel brakes after the commencement of an EBD control if:

a vehicle deceleration after EDB commencement has risen above a predetermined minimum value or the presence of criteria which indicate brake fading, an imminent risk of brake fading or a situation with a risk of brake fading, or a malfunction in the brake system is detected, or a vehicle deceleration exceeds a high limit value which is critical for the safety of the vehicle varying a counter during brake actuation according to a predetermined time frame, using the counter value as an indication of brake fading, or imminent risk of brake fading, or of a malfunction.

2. Method as claimed in claim 1, further including the step of:
   detecting vehicle deceleration
   comparing the detected vehicle deceleration against a predetermined minimum threshold the exceeding of which is evaluated as a criterion for allowing a braking pressure increase in the rear-wheel brakes, with 'g' meaning the constant of acceleration due to gravity.

3. Method as claimed in claim 1, further including the step of:
   increasing the counter content in the predetermined time frame by a value which is a function of the increase in vehicle deceleration, or decreasing the counter content in the predetermined time frame by a value which depends on the decrease of the vehicle deceleration.

4. Method as claimed in claim 3, wherein the increase of the counter content sets in with the rise in the vehicle deceleration by roughly 0.1 to 0.15 g per frame step, and wherein the counter content is increased more quickly as the vehicle deceleration increases.

5. Method as claimed in claim 3, wherein the counter content is decreased completely, or in steps according to a predetermined frame, after a release of the brake, or uncoupling of the brake pedal, or change of the signal of the brake light switch.

6. Method as claimed in claim 3, wherein the counter rate by which the counter content is increased or decreased is varied in dependence on the vehicle speed.

7. Method as claimed in claim 1, further including the step of: producing and evaluating a temperature model for determining the approximate brake temperature, and eliminating the limitation of the braking pressure buildup on the rear-wheel brakes when a critical temperature is exceeded.

8. Method as claimed in claim 1, further including the step of:
   setting the high limit vehicle deceleration value to a value in the range of 0.35 g to 0.5 g as a value which is critical with respect to safety.

* * * * *